3,539,575
NOVEL BENZOCYCLOBUTENE DERIVATIVES
Joseph A. Skorcz, Milwaukee, Wis., assignor to Colgate-Palmolive Company, New York, N.Y., a corporation of Delaware
No Drawing. Continuation-in-part of application Ser. No. 452,873, May 3, 1965. This application Jan. 22, 1968, Ser. No. 699,328
Int. Cl. C07d 39/00
U.S. Cl. 260—281     3 Claims

ABSTRACT OF THE DISCLOSURE

The compounds are spiro derivatives of benzocyclobutene which are useful as skeletal muscle relaxants and central nervous system depressants. A compound disclosed is spiro [benzocyclobutene-1,3'-(2',6'-dioxopiperidine)].

---

This application is a continuation-in-part of my copending application Ser. No. 452,873 filed May 3, 1965, now abandoned.

DETAILED DESCRIPTION

The novel compounds of the present invention have the following formula:

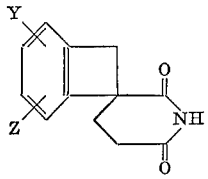

in which Y and Z represent hydrogen, lower alkoxy such as methoxy, ethoxy and propoxy, methylenedioxy and trifluoromethyl.

The preferred method of preparing the novel compounds of the present invention employs as a starting material a 1-cyano benzocyclobutene of the formula

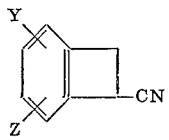

in which Y and Z have their previously assigned values.
Some of such starting materials are the following:

1-cyanobenzocyclobutene,
1-cyano-4-trifluoromethylbenzocyclobutene,
1-cyano-4,5-methylenedioxybenzocyclobutene, and
1-cyano-5-methoxybenzocyclobutene.

The 1-cyanobenzocyclobutenes are then treated with acrylonitrile in the presence of a base such as methanolic potassium hydroxide at reduced temperatures. This process of preparing the dinitrile compounds may be illustrated as follows:

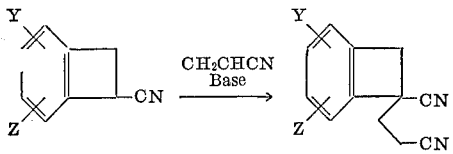

Representative of the compounds which may be prepared in this manner are the following:

1-cyano-1-(2-cyanoethyl)-benzocyclobutene,
1-cyano-1-(2-cyanoethyl)-5-methoxybenzocyclobutene, and
1-cyano-1-(2-cyanoethyl)-4-trifluoromethylbenzocyclobutene.

The spiro compounds of the present invention may be readily prepared by dissolving the corresponding dinitrile in glacial acetic acid and treating it with concentrated sulfuric acid in an oil bath at an elevated temperature of 100° to 120° C. The reaction proceeds rapidly and is usually substantially completed in about 20 minutes.
This reaction may be illustrated as follows:

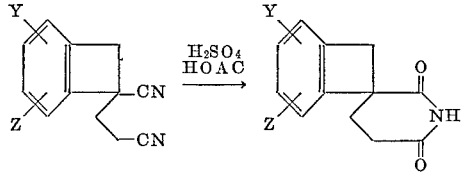

Representative of the compounds which may be prepared in this manner are the following:

Spiro[benzocyclobutene-1,3'-(2',6'-dioxopiperidine)],
Spiro[4-trifluoromethylbenzocyclobutene-1,3'-(2',6'-dioxopiperidine)],
Spiro[4,5-methylenedioxybenzocyclobutene-1,3'-(2',6'-dioxopiperdine)], and
Spiro[5-methoxybenzocyclobutene-1,3'-(2',6'-dioxopiperdine)].

The novel compounds of the invention have also been shown to possess a skeletal muscle relaxant and central nervous system depressant effect. In pharmacological tests in the standard "spinal cat" preparation the compound spiro[benzocyclobutene-1,3'-(2',6'-dioxopiperidine)] has been found to exhibit skeletal muscle relaxant activity at a dose of 8 to 12 mg./kg. which is approximately the same dose range of effectiveness as the commercially available skeletal muscle relaxant Paraflex.

In the "spinal cat" experiment the compound to be evaluated is administered in intravenous doses to cats of which the spinal cord has been cut at the neck to eliminate any interference from the brain. The monosynaptic and polysynaptic reflexes are then elicited in the cat and the results compared to the results obtained in the same animal prior to medication and after medication with the commercially available skeletal muscle relaxant.

The compound also demonstrated in behavioral screening test a central nervous system depressant effect. In mice receiving intraperitoneal doses of 300 to 3,000 mg./kg. of the compound, the body temperature, awareness and spontaneous activity of the animals was markedly depressed. Consistent muscle tone depression and ataxia were seen at even lower doses of 30 and 100 mg./kg. As a result of the behavioral test the compound was found to have an $LD_{50}$ in excess of 3,000 mg./kg. The studies were conducted in accordance with the procedure set forth by Irwin in "Animal and Clinical Pharmacologic Techniques in Drug Evaluation," J. H. Nodine and P. E. Siegler, Ed., Year Book Publishers, Inc. 1964, pp. 36–54.

When intended for use as pharmaceutical agents the compounds are preferably formed into pharmaceutical compositions intended for oral or parenteral administration.

The compositions may contain, in addition to the active ingredient, such conventional pharmaceutical diluents as starch, sugar and talc, as well as lubricants such as magnesium stearate, binders such as gelatin and disintegrating and flavoring materials.

Unit dosage forms of the active ingredient such as tablets, capsules and solutions may contain any suitable predetermined amount of the active ingredient and may be administered in one or more daily doses depending upon the severity of the patient's condition, his size, age and weight. Such unit dosage forms, however, will generally contain about 5 to 150 mg. of the active ingredients.

The following examples are presented to illustrate the practice of the invention:

EXAMPLE 1

1-cyano-1-(2-cyanoethyl)-benzocyclobutene

A stirred solution of 0.02 mole of 1-cyanobenzocyclobutene and 2 ml. of 30% methanolic potassium hydroxide in 75 ml. of t-butanol at 10° is treated dropwise with 0.22 mole of acrylonitrile in 30 ml. of t-butanol. The temperature is maintained below 20° during the 1 hour addition period. The solution is stirred overnight at room temperature, neutralized with 20% hydrochloric acid, diluted with 250 ml. of water, and extracted with two 200 ml.-portions of ether, which are combined and dried over anhydrous sodium sulfate. Distillation of the oil obtained by solvent evaporation provides 1-cyano-1-(2-cyanoethyl)-benzocyclobutene in the form of a viscous liquid, B.P. 127–130° at 0.15 mm.

*Analysis.*—Calcd. for $C_{12}H_{10}N_2$ (percent): C, 79.09; H, 5.53; N, 15.37. Found (percent): C, 78.94; H, 5.65; N, 15.12.

EXAMPLE 2

Spiro[benzocyclobutene-1,3'-(2',6'-dioxopiperidine)]

A solution of 0.03 mole of the dinitrile of Example 1 in 10 ml. of glacial acetic acid and 4 ml. of concentrated sulfuric acid is heated at an oil bath temperature of 120° for 10 minutes. The warm solution is poured onto ice and neutralized immediately with solid sodium bicarbonate. The precipitated material is taken up in two 100 ml.-portions of chloroform, which are combined, washed with saturated brine solution, and dried over anhydrous sodium sulfate. The solid remaining after solvent evaporation is recrystallized from ethyl acetate-n-hexane to yield spiro[benzocyclobutene - 1,3' - (2',6'-dioxopiperdine)] in the form of a colorless powder, M.P. 189–191°.

*Analysis.*—Calcd. for $C_{12}H_{11}NO_2$ (percent): C, 71.62; H, 5.51; N, 6.96. Found (percent): C, 71.59; H, 5.35; N, 7.00.

We claim:
1. A compound of the formula

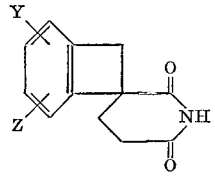

in which Y and Z represent hydrogen, methoxy, ethoxy, propoxy, and trifluoromethyl.

2. A compound of claim 1 in which Y and Z are hydrogen.

3. A compound of claim 1 in which Y and Z are selected from hydrogen, methoxy and trifluoromethyl.

References Cited

UNITED STATES PATENTS

| | | | |
|---|---|---|---|
| 3,150,143 | 9/1964 | Grogan | 260—281 X |
| 3,308,157 | 3/1967 | Robertson et al. | 260—562 |

FOREIGN PATENTS

| | | |
|---|---|---|
| 917,940 | 2/1963 | Great Britain. |

DONALD G. DAUS, Primary Examiner

U.S. Cl. X.R.

260—340.5, 465, 465.9; 424—267